Aug. 2, 1966
W. HAMPL
3,263,586
CIRCULAR OR LONGITUDINAL SCALES FOR
PHOTOMECHANICAL CONTACT COPYING
Filed Oct. 22, 1963
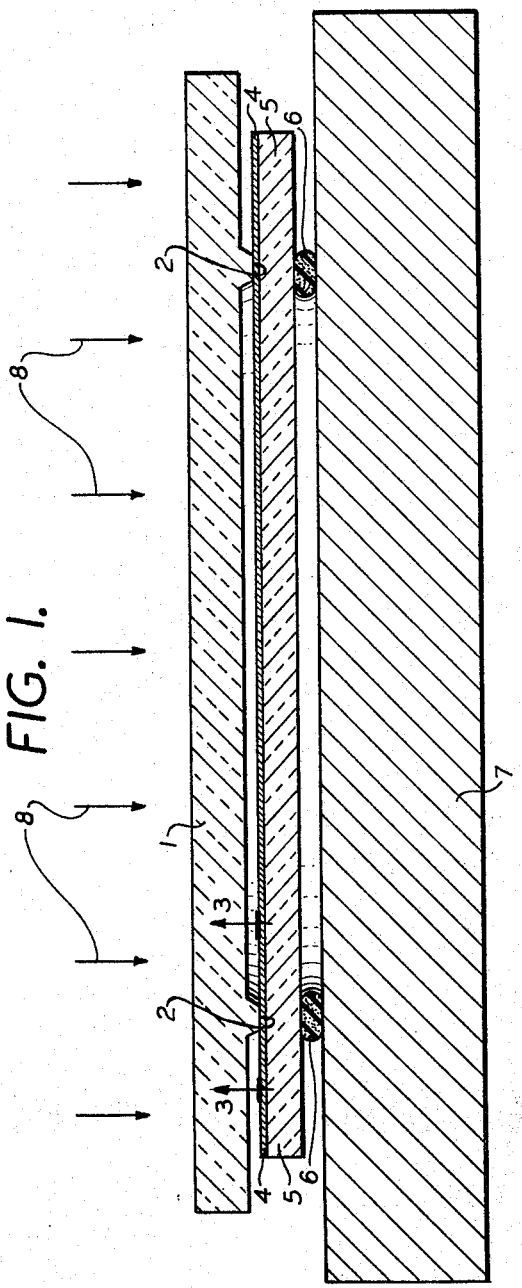
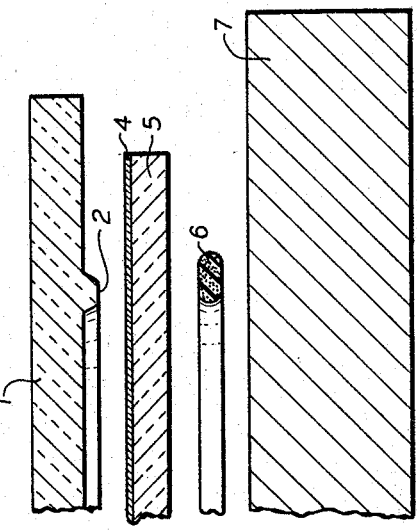
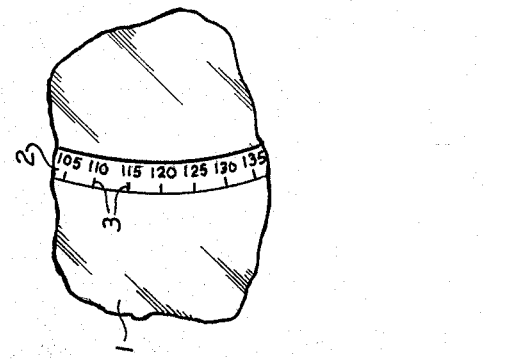
INVENTOR
WALTER HAMPL
BY
ATTORNEY.

United States Patent Office 3,263,586
Patented August 2, 1966

3,263,586
CIRCULAR OR LONGITUDINAL SCALES FOR PHOTOMECHANICAL CONTACT COPYING
Walter Hampl, Traunreut, Upper Bavaria, Germany, assignor to Wenczler & Heidenhain, Traunreut, near Traunstein, Upper Bavaria, Germany, a corporation of Germany
Filed Oct. 22, 1963, Ser. No. 317,947
1 Claim. (Cl. 95—73)

The present invention relates to circular or longitudinal scales which permit the reproduction of additional circular or longitudinal scales by contact-copying in a photomechanical process.

In contact-copying, the pattern and the light sensitive layer of the copy to be produced are disposed in known manner directly one upon another. It is essential for the quality of the produced copy, that the pattern and the light sensitive layer are directly in contact at each point of the scale to be copied and that nowhere intermediate spaces occur. Such contact copying procedure is disclosed in U.S. Patent No. 2,999,034, dated September 5, 1961.

If two plane surfaces are superposed upon each other, there is by no means an assurance that they contact each other also at each point. Upon slight deviations from the ideal formation of the surfaces or upon clamping-in of unavoidable smallest dust particles, the distance between the two plane surfaces can increase at a few points to an extent that a non-objectionable copy becomes questionable.

In order to bring about, nevertheless, the contact over the entire surface, the pattern and the copy have hitherto been pressed toward each other by the application of external forces. The two parts became deformed thereby, however, so that the copied scale was sharp, but not any more true to the measures. There was also the danger that the clamped-in dust particles were pressed into the light sensitive layer and damaged the latter.

It is therefore, one object of the present invention to provide circular or longitudinal scales and a method of manufacture and reproduction thereof wherein these drawbacks are avoided.

It is another object of the present invention to provide circular or longitudinal scales and a method of manufacture and reproduction thereof, wherein the scale serving as a pattern is particularly designed in such manner that a scale zone including the pattern is formed on an elevated face relative to the remaining far greater portion of the surface of the scale carrier. By this design it is brought about that only the relatively small elevated scale zone engages the light sensitive layer and consequently the high surface pressure required for a non-objectionable contact can be brought about already by a small engaging force. Thus deformations caused by high pressure forces and deviations of the copy from the pattern, created by the high pressure forces, are avoided. Furthermore, it is also substantially easier, to keep free the relatively small scale zone from dust particles, than the entire scale carrying surface of the carrier plate. Moreover the requirements for the planeness of the scale suface of the copy can be substantially lower, because only the zone predetermined for engagement with the pattern must be plane.

With these and other objects in view which will become apparent in the following detailed description, the present invention will be clearly understood in connection with the accompanying drawing, in which:

FIGURE 1 is a vertical section of the members for performing the copying process with a scale according to the present invention;

FIG. 2 is a fragmentary sectional exploded view of the members disclosed in FIG. 1; and FIG. 3 is a fragmentary view of the scale of the present invention taken along the line 3—3 of FIG. 1.

Referring now to the drawing, the scale carrier 1 carries a circular scale serving as a pattern and has a circular embossed face 2 in the area of its scale zone. The level difference between the circular embossed face 2 and the remainder of the scale-side surface of the scale carrier 1 is about one to several tenths of a millimeter, while the width of the scale zone amounts to about 1 to 2 millimeters. The mentioned measure are no limiting values, rather they are only examples of the given measures. The numbers and lines 3 constituting the scale consist of thin layers of opaque material applied in vapor form in a vacuum, the thickness of the layers being only parts of the light wave lengths, so that the layers do not interfere with the contact between the scale surface 2 and light sensitive layer 4 of a carrier 5, a portion of the layer 4 being adapted to form the copy on the carrier 5.

The scale carrier 1 rests on the carrier 5, whereby the high face pressure required for the proper position is made possible by the relatively small engagement face of the scale zone. Dust particles which happen to be outside of the scale zone between the carriers 1 and 5, as well as irregularities of the surface of the carrier 5 outside of the scale zone do not influence the intimate contact between the pattern and the copy. The carrier 5 for the copy is disposed in turn on a yielding base 6 of foam rubber, so that deforming forces cannot be exerted upon the carrier 5 also by the rigid base 7.

For the production of the copy, the pattern on the carrier 1 is exposed from behind, as indicated by arrows 8 (FIG. 1), whereupon the light sensitive layer 4 is further treated. Due to the excellent sharpness and exactness of the latent image in the layer 4 a known method, disclosed in United States Patent No. 2,999,034, dated September 5, 1961, is suitable for the further treatment of this layer and preferably the known method according to which after exposure the non-hardened portions of the layer are washed out, whereafter sign forming material, preferably chrome, is applied in vapor form in vacuum into the recesses created by the washing step, and finally the hardened portions of the light sensitive layer jointly with the covered portions of the layer applied thereto in vapor form are also removed by means of a solvent.

For the production of a scale carrier 1 suitable steps are taken such that the scale 3 is applied to a plane polished surface of the carrier 1, and then the range of the scale zone 2 is covered with a lacquer which is resistant against fluoric acid. Hereafter the etching is performed to the desired depth of about 1/10 mm. and the cover is again removed, so that the elevated scale zone 2 remains as a remainder of the originally complete surface of the carrier 1.

While I have disclosed one embodiment of the present invention, it is to be understood that this embodiment is given by example only and not in a limiting sense, the scope of the present invention being determined by the objects and the claim.

I claim:
A scale carrier of transparent material for photomechanical contact copying, comprising,
    a first larger surface on the scale side of said carrier,
    a second plane surface comprising a scale carrying portion,
    said scale carrying portion being of smaller area relative to the total area of said carrier and raised relative to the general surface of said carrier, at a distance such that only the scale carrying portion of said carrier will contact a light sensitive layer of another carrier on which the copy of said scale is to be formed, and a scale formed as a thin layer of material on said raised scale carrying portion, the thickness of said layer forming said scale being in the order of a fraction of wavelength of light.

References Cited by the Examiner

UNITED STATES PATENTS

| | | | |
|---|---|---|---|
| 1,544,723 | 7/1925 | Buxbaum | 95—77 |
| 2,042,049 | 5/1936 | Heidenhain | 96—36 |
| 2,073,313 | 3/1937 | Murray | 95—76 |
| 2,627,795 | 2/1953 | Murphy | 95—73 X |
| 3,020,817 | 2/1962 | Burch | 95—73 |

FOREIGN PATENTS

| | | |
|---|---|---|
| 697,036 | 9/1953 | Great Britain. |
| 301,443 | 10/1932 | Italy. |

OTHER REFERENCES

Photographic Methods for Producing Reticles, by Carl Leistner, published in Photographic Engineering, vol. 1, issue No. 1, pages 7–15, January 1950.

JULIA E. COINER, *Primary Examiner.*

EVON C. BLUNK, *Examiner.*